United States Patent
Brown et al.

(10) Patent No.: US 8,170,909 B2
(45) Date of Patent: May 1, 2012

(54) SYSTEM AND METHOD FOR MONITORING RETAIL STORE PERFORMANCE

(75) Inventors: Robert Kruger Brown, Edina, MN (US); Gregory Allen McDonald, Shakopee, MN (US); Caroline Louise Slettedahl, Roseville, MN (US); Robert Francis Foster, Ramsey, MN (US); Richard Scott Post, Little Canada, MN (US)

(73) Assignee: Target Brands, Inc., Minneapolis, MN (US)

( * ) Notice: Subject to any disclaimer, the term of this patent is extended or adjusted under 35 U.S.C. 154(b) by 290 days.

(21) Appl. No.: 12/616,078

(22) Filed: Nov. 10, 2009

(65) Prior Publication Data
US 2010/0131340 A1    May 27, 2010

Related U.S. Application Data

(63) Continuation of application No. 10/980,574, filed on Nov. 3, 2004, now abandoned.

(51) Int. Cl.
G06Q 10/00 (2006.01)
H04N 7/18 (2006.01)
G06K 9/00 (2006.01)

(52) U.S. Cl. ............. 705/7.42; 705/7.11; 705/7.12; 705/7.13; 705/7.15; 705/7.16; 705/7.17; 348/149; 348/150; 348/156; 382/100

(58) Field of Classification Search .............. None
See application file for complete search history.

(56) References Cited

U.S. PATENT DOCUMENTS

| | | | |
|---|---|---|---|
| 5,097,328 A | 3/1992 | Boyette | |
| 5,111,291 A | 5/1992 | Erickson et al. | |
| 5,390,107 A * | 2/1995 | Nelson et al. | 705/7.13 |
| 5,455,561 A | 10/1995 | Brown | |
| 5,551,021 A | 8/1996 | Harada et al. | |
| 5,581,625 A | 12/1996 | Connell | |
| 5,974,219 A | 10/1999 | Fujita et al. | |
| 6,011,537 A | 1/2000 | Slotznick | |
| 6,016,139 A | 1/2000 | Terasawa et al. | |

(Continued)

FOREIGN PATENT DOCUMENTS

JP    09-295698    11/1997

(Continued)

OTHER PUBLICATIONS

"Connecticut Department of Transportation," http://www.dotct.state.ct.us/trafficcam.aspx?dotNav=>, publicly available at least as early as Nov. 3, 2004, 1 page (Continued)

*Primary Examiner* — Lynda Jasmin
*Assistant Examiner* — Sujay Koneru
(74) *Attorney, Agent, or Firm* — Nixon & Vanderhye P.C.

(57) ABSTRACT

A system for monitoring the performance of at least one task associated with operation of a retail store. The system includes at least one monitoring device positioned and adapted to provide images of at least one location within the retail store, with each image showing at least one factor related to performance of the at least one task. A controller is adapted to obtain and store images from the at least one monitoring device. An interface is adapted to enable a user to selectively view stored images and to manually analyze the at least one factor shown in the viewed images to evaluate the performance of the at least one task.

19 Claims, 6 Drawing Sheets

U.S. PATENT DOCUMENTS

| | | | |
|---|---|---|---|
| 6,195,121 B1 | 2/2001 | Huang et al. | |
| 6,714,236 B1 | 3/2004 | Wada et al. | |
| 6,788,333 B1 | 9/2004 | Uyttendaele et al. | |
| 6,980,088 B2* | 12/2005 | Stambaugh | 340/286.09 |
| 7,286,158 B1* | 10/2007 | Griebenow | 348/156 |
| 7,792,256 B1* | 9/2010 | Arledge et al. | 379/102.01 |
| 2002/0016971 A1* | 2/2002 | Berezowski et al. | 725/105 |
| 2003/0098910 A1* | 5/2003 | Kim | 348/150 |
| 2003/0107649 A1* | 6/2003 | Flickner et al. | 348/150 |
| 2003/0197782 A1* | 10/2003 | Ashe et al. | 348/150 |
| 2003/0212567 A1 | 11/2003 | Shintani et al. | |
| 2004/0203878 A1* | 10/2004 | Thomson | 455/456.1 |
| 2005/0038695 A1* | 2/2005 | Matsko | 705/10 |
| 2005/0073585 A1 | 4/2005 | Ettinger et al. | |
| 2006/0004581 A1* | 1/2006 | Claudatos et al. | 704/275 |
| 2006/0053342 A1 | 3/2006 | Bazakos et al. | |
| 2007/0152810 A1* | 7/2007 | Livingston et al. | 340/539.1 |
| 2008/0059274 A1 | 3/2008 | Holliday | |

FOREIGN PATENT DOCUMENTS

| | | |
|---|---|---|
| JP | 2003-242587 | 8/2003 |
| JP | 2003-244506 | 8/2003 |

OTHER PUBLICATIONS

"Maidenhead Rowing Club River Thomas Web Camera-About the View," http://www.maidenheadrec.org.uk/webcam/things_to_spot. htm, publicly available at least as early as Nov. 3, 2004, 5 pages.

"Today-Okoboji Live-Okoboji Online," http//www.okoboji.com/live/today/>, publicly available at least as early as Nov. 3, 2004, 4 pages.

"Web Cam: Iowa State University," http://www.iastate.edu/webcam. html>, publicly available at least as early as Nov. 3, 2004, 1 page.

* cited by examiner

SYSTEM AND METHOD FOR MONITORING RETAIL STORE PERFORMANCE

CROSS-REFERENCE TO RELATED APPLICATION

This application is a continuation of and claims priority under 35 U.S.C. §120 to U.S. patent application Ser. No. 10/980,574, filed Nov. 3, 2004, which is incorporated herein in its entirety.

BACKGROUND OF THE INVENTION

As the retail industry continues to become more competitive, customer satisfaction is of paramount importance in establishing and maintaining customers. Customer satisfaction depends on a variety of factors such as a customer's perception of price, product availability, well-stocked shelves, ease of finding products within a retail store, cleanliness of the store, and friendliness of employees.

However, perhaps the most important factor regarding customer satisfaction is customer service. Of primary concern with regard to customer service is the amount of time a customer must wait when requiring assistance from a store employee. This includes, for example, time spent waiting for assistance at a customer service counter, at a merchandise counter and, of course, time spent waiting in check-out lanes. Generally speaking, the less time spent waiting for assistance, the more satisfied the customer.

SUMMARY OF THE INVENTION

One embodiment of the present invention relates to a system for monitoring the performance of at least one task associated with operation of a retail store. The system comprises at least one monitoring device positioned and adapted to provide images of at least one location within the retail store, with each image showing at least one factor related to performance of the at least one task. The system further includes a controller and an interface. The controller is adapted to obtain and store images from the at least one monitoring device. The interface is configured to enable a user to selectively view stored images and to manually analyze the at least one factor shown in the viewed images to evaluate the performance of the at least one task.

BRIEF DESCRIPTION OF THE DRAWINGS

Embodiments of the invention will be described with respect to the figures, in which like reference numerals denote like elements, and in which.

DETAILED DESCRIPTION

Figure 1:
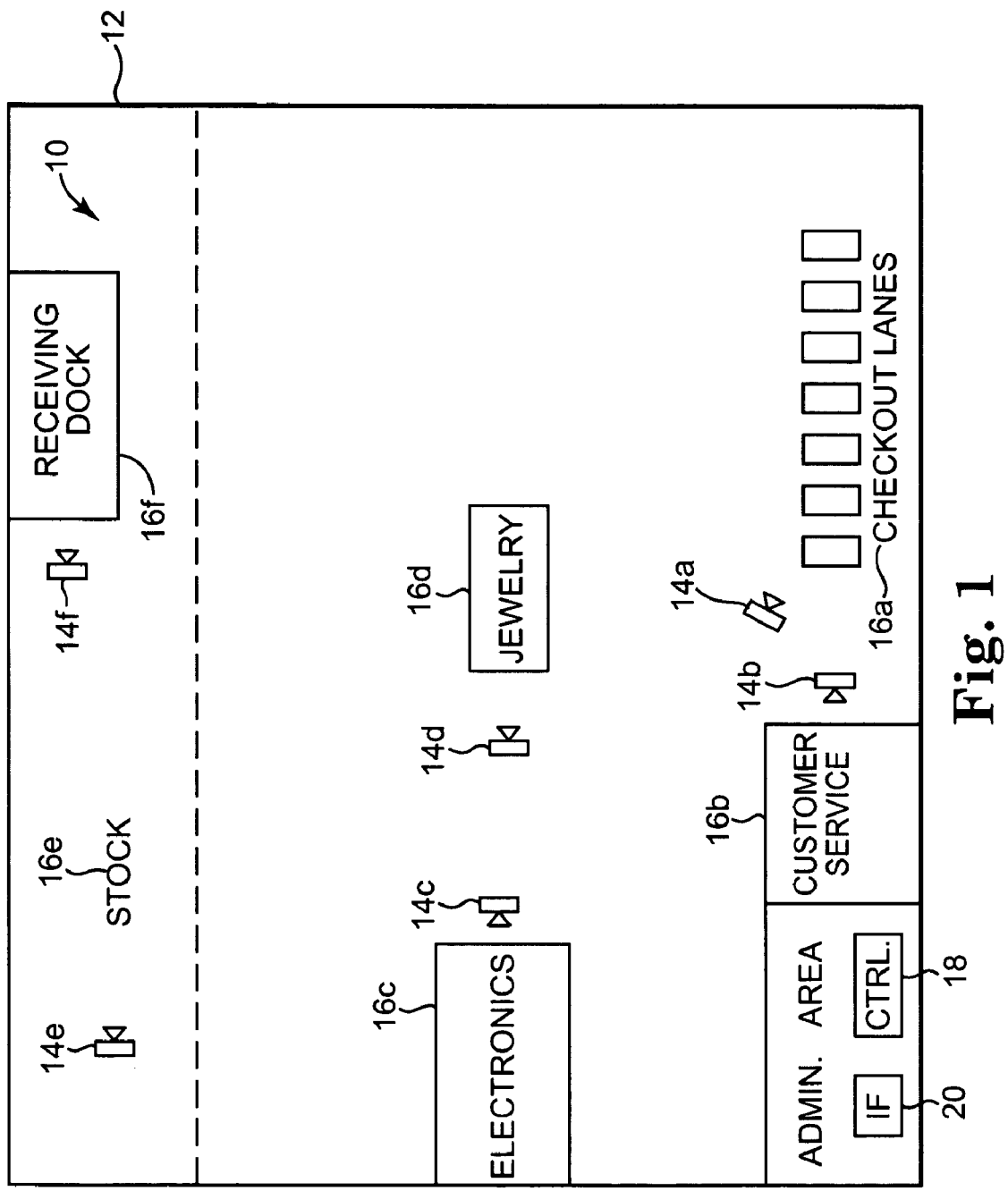
FIG. 1 is block diagram illustrating one embodiment of a performance monitoring system according to the present invention.

FIG. 1 is a block diagram generally illustrating one embodiment of a performance monitoring system 10 according to the present invention for monitoring the performance of at least one task associated with operation of a retail store 12. Performance monitoring system 10 includes a plurality of monitoring devices 14, each positioned to view a corresponding location 16 within retail store 12 and adapted to provide images of the corresponding location 16, each image showing at least one factor related to performance of at the at least one task. In one embodiment, monitoring devices 14 comprise cameras. In one embodiment, monitoring devices 14 comprise analog video cameras adapted to provide analog video of corresponding locations 16. In one embodiment, monitoring devices 14 comprise digital video cameras adapted to provide digital video of corresponding locations 16. As illustrated, analog video cameras 14a through 14f respectively correspond to store locations indicated as checkout lanes 14a, customer service desk 14b, electronics counter 14c, jewelry counter 14d, stockroom 14e, and receiving area 14f. Although illustrated as having analog video cameras 14a through 14f, monitoring system 10 can include more or fewer cameras 14 at locations other than locations 16 indicated by FIG. 1. Additionally, multiple cameras may be used to monitor a single store location, such as check lanes 16a.

Performance monitoring system 10 further includes a controller 18 and an interface 20. Controller 18 is adapted to automatically obtain and store still images from each of the monitoring devices 14 at selectable intervals. In one embodiment, controller 18 is adapted to obtain still images in a digital format, such as JPG format, for example, from analog video cameras 14 at selected intervals. In one embodiment, the selectable intervals are regular intervals, such as every fifteen minutes, for example.

Interface 20 is adapted to enable a user, such as a store manager, to selectively view the stored images and to manually analyze the at least one factor shown in the viewed images to evaluate the performance of the at least one task. Examples of such factors include number of employees and an amount of unloading time required when evaluating the task of unloading an incoming shipment of products at receiving dock 16f, and a number of customers awaiting service when evaluating the tasks of processing customers at check lanes 16a or assisting customers at customer service area 16b, electronics counter 16c, and jewelry counter 16d. Any number of other tasks associated with operation of retail store 12 can be similarly monitored by providing and positioning cameras 14 at other locations within retail store 12 as required.

By providing monitoring of selected areas of a retail store, performance monitoring system 10 enables a user, such as a store manager, to evaluate performance of selected tasks associated with the operation of the retail store. Based on such evaluations, performance of certain tasks can be adjusted to improve the store's performance. For example, staffing requirements at certain store locations, particularly at check lanes, can be evaluated and adjusted in order to minimize customer wait times and thereby likely improve customer satisfaction. Furthermore, by storing the images, monitoring system 10 enables a user, such as a store manager, to evaluate the performance of tasks at any suitable time and does not require real-time monitoring.

Components of the present invention can be implemented in hardware via a microprocessor, programmable logic, or state machine, in firmware, or in software with a given device. In one aspect, at least a portion of the software programming is web-based and written in HTML and JAVA programming languages, including links to user interfaces, such as a Windows based operating system, and each of the main components may communicate via a network using a communication protocol. For example, the present invention may or may not use a TCP/IP protocol for data transport. Other programming languages and communication protocols suitable for use with the present invention will become apparent to those skilled in the art after reading the present application. Components of the present invention may also reside in software on one or more computer-readable mediums, which is defined herein to include any kind of memory, volatile or non-volatile, such as floppy disks, hard drives, read-only memory (ROM), CD-ROMs, flash memory, and random access memory (RAM).

Figure 2:
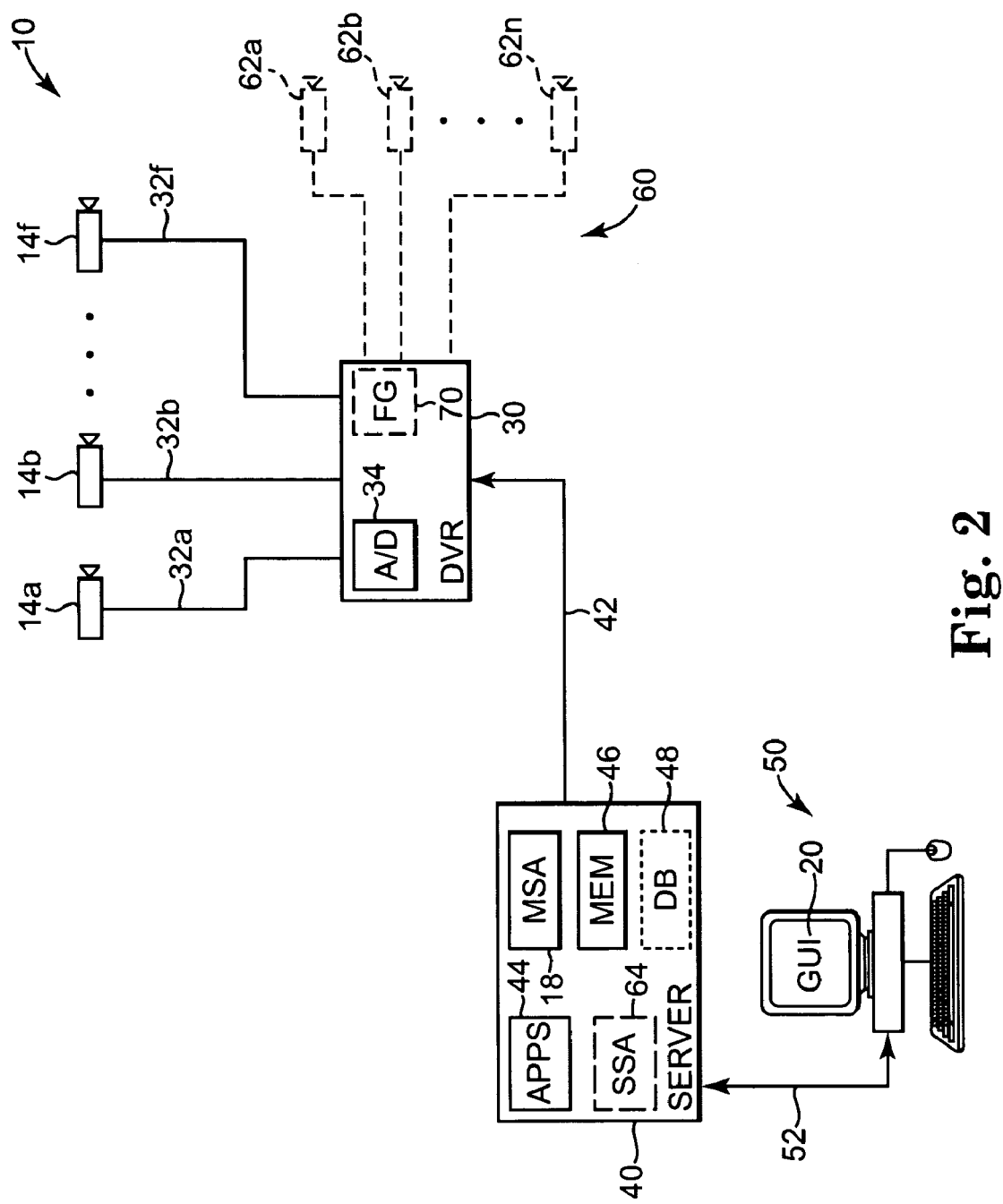
FIG. 2 is a block diagram illustrating one embodiment of a performance monitoring system according to the present invention.

FIG. 2 is a block and schematic diagram illustrating one embodiment of performance monitoring system 10 for retail store 12 as illustrated generally by FIG. 1. Performance monitoring system 10 includes a plurality of analog video cameras 14, such as analog video cameras 14a through 14e. Each camera 14 is coupled to a digital video recorder (DVR) 30 via a corresponding link 32. Each camera 14 is configured as a unique channel and provides an analog video signal of its associated store location 16 via corresponding link 32 to DVR 30. DVR 30 includes an analog-to-digital converter (A/D) 34 which converts the analog video signal of each camera (or channel) 14 to a corresponding digital video having a digital video format, such as AVI, for example. DVR 30 is configured to store a predetermined amount of the digital video for each camera 14. In one embodiment, for example, DVR 30 stores a day's worth of digital video for each camera 14, with the stored digital video being replaced with the digital video for each subsequent day.

A server 40 is coupled to DVR 30 via a link 42. In one embodiment, controller 18 comprises a monitoring system application (MSA) comprising an electronically readable code which is installed and operating on server 40. In one embodiment, in addition to MSA 18, store server 40 includes various other applications 44 related to operation of retail store 12. MSA 18 is adapted to automatically retrieve digital still images for each camera 14 at regular intervals from DVR 30 via link 42. In one embodiment, MSA 18 is adapted to retrieve the digital still images for each camera by selecting a single frame from a selectable time period of the digital video of each camera stored in DVR 30 and by converting the selected digital video frame from a digital video from, such as AVI, to a digital still picture format, such as JPG. In one embodiment, MSA 18 stores the retrieved digital still images for each camera in a memory 46 according to a directory and file naming convention. In an alternate embodiment, MSA 18 stores the retrieved digital still images in a database 48. Although illustrated as being within server 40, in other embodiments, database 48 could be located external to server 40.

In one embodiment, interface 20 comprises a graphical user interface (GUI) adapted to display the digital still photos stored in database 46 and which is viewable via a personal computer (PC) 50 coupled to server 40 via a link 52. Although illustrated as being viewed via PC 50, in other embodiments, GUI 20 may be viewed via other electronic viewing devices, such as a personal digital assistant (PDA) or Blackberry device, for example.

In one embodiment, DVR 30 comprises a portion of a security system 60 which further includes a plurality of analog video cameras 62 providing surveillance video of retail store 12 for purposes of assets protection. Surveillance system 60 is controlled by a security system application (SSA) 64 comprising a computer readable code which is installed and operating on store server 40. In one embodiment, analog video cameras 16 are dedicated for use as surveillance cameras for assets protection and analog video cameras 14 are employed both as surveillance cameras by security system 60 and as monitoring cameras by performance monitoring system 10. Security system 60 utilizes the entire video signal of analog video cameras 14 and 62 stored in DVR 30, while performance monitoring system 10 utilizes the digital images obtained by controller 18 and stored in database 46.

In one embodiment, security system 60 represents an existing surveillance system within retail store 12. If analog video cameras 62 of security system 60 are already positioned or can be repositioned to view all locations desired to be monitored by performance monitoring system 10 (e.g., locations 16 as illustrated by FIG. 1), analog video cameras 14 are not required and MSA 18 of performance monitoring system 10 can obtain images as necessary from existing analog video cameras 62. However, if analog video cameras 62 of security system 60 are not, or cannot, be positioned to view all desired store locations 16, analog video cameras 14 are added to security system 60 and positioned to view the otherwise non-observed areas. In such a scenario, while the primary function of analog video cameras 14 is to provide images for performance monitoring system 10, analog video signals provided by analog video cameras 14 via links 32 can also be utilized for assets protection purposes by security system 60.

In one embodiment, in lieu of a digital recording device, recording device 30 comprises some type of analog recording device, such as one or more video tape recording devices adapted to record the analog video signals received via links 32 from each camera, or channel. In such an embodiment, performance monitoring system 10 further includes a "frame grabber" (FG) 70 adapted to capture at regular intervals a single frame of the analog video signal provided by each camera 14 prior to the analog video signal being recorded by the analog recording device, and to convert the single frame to a digital still image which is subsequently stored in memory 46.

In one embodiment, cameras 14 comprise digital still cameras configured to provide digital still images of store locations 16 at intervals as directed by MSA 18. In this embodiment, digital still images from cameras 14 can be stored directly to database 46 as directed by MSA 18. As such, recording device 30 is not required in this embodiment.

Figure 3:
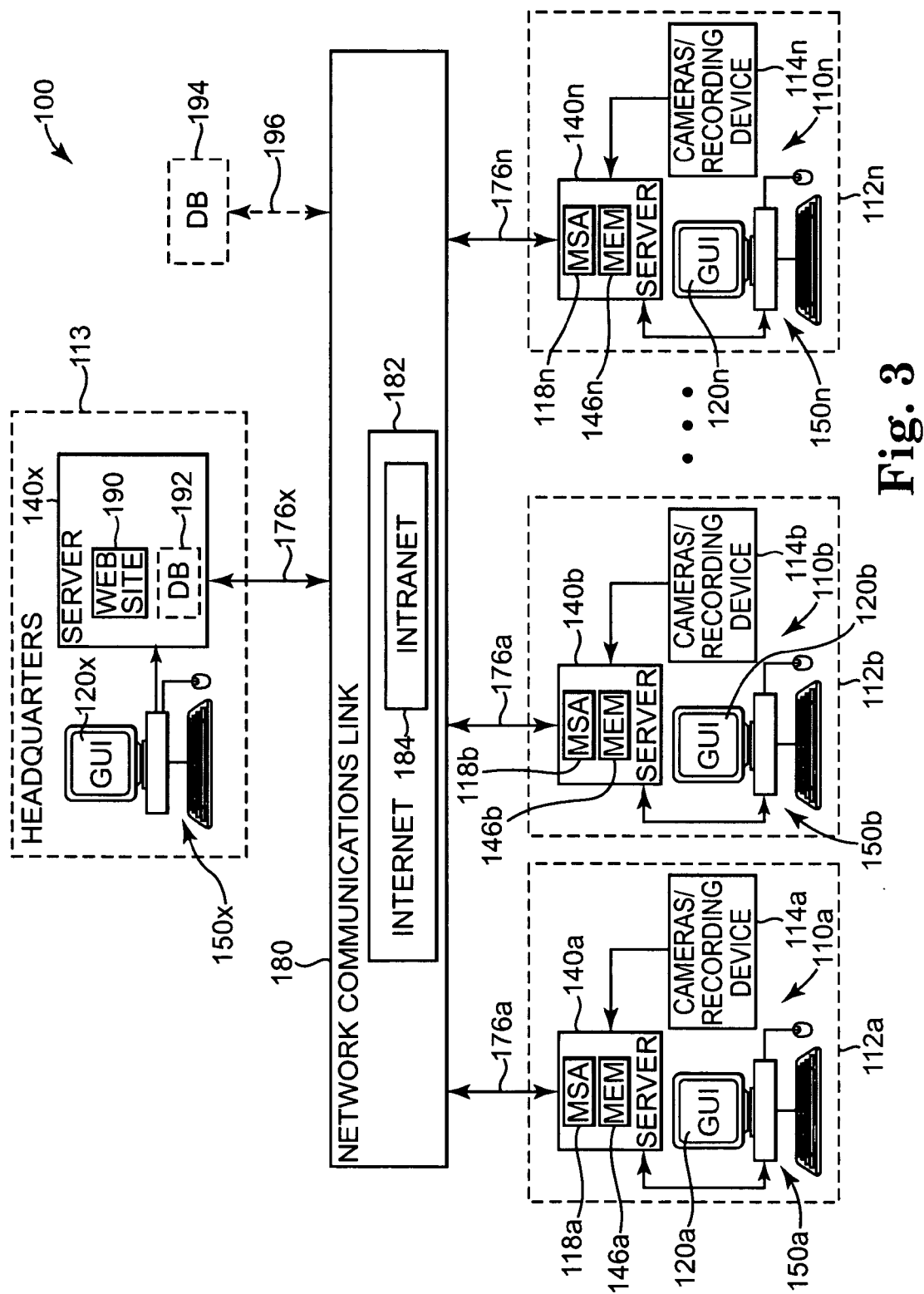
FIG. 3 is a block diagram illustrating one embodiment of a performance monitoring system according to the present invention.

FIG. 3 is a block diagram illustrating one embodiment of a performance monitoring system 110 according to the present invention configured as a network system distributed across a plurality of retail stores 112 and a headquarters facility 113 of a retail corporation. In one embodiment, as illustrated, each retail store 112a through 112n respectively includes a monitoring system 110a to 110n. In one embodiment, monitoring systems 110 are similar to monitoring system 10 of retail store 12 described above by FIG. 2, with each monitoring system 110 including a plurality of digital video cameras and a digital recording device (indicated generally at 114), and an MSA 118 and database 146 installed and operating on a server 140. Each monitoring system 110 further includes a GUI 120 viewable via an electronic viewing device, such as PC 150.

Headquarters facility 113 includes a server 140x and at least one electronic viewing device, such as PC 150x, for viewing GUI 120x.

Monitoring systems 110a to 110n of are respectively coupled to a network communications link 180 via communications links 176a to 176n and headquarters facility 113 is coupled to network communications link 180 via communications link 176x. Network communication link 180, as employed herein, includes an Internet communications link, an intranet communication link, or similar high-speed communication link. In one embodiment, network communication link 18 includes an Internet communications link 182. Internet communications link permits communication between performance monitoring systems 110 of stores 112 and between performance monitoring systems 110 of stores 110 and headquarters facility 113.

In one embodiment, network communications link 180 includes an Intranet communications link 184 linking retail stores 112 and headquarters facility 113 by means of Internet communications link 182. Intranet communications link 184 provides a controlled-access communications link between stores 112 and headquarters facility 113 which is accessible via a password or other user-recognition mechanism.

MSA 118 of monitoring system 110 of each retail store 112 is configured to obtain and store digital images of desired locations within retail store 112 (e.g. locations 16 as illustrated by FIG. 1) in memory 146 of server 140 of corresponding retail store 112. In other embodiments, in lieu of monitoring systems 110 storing digital images in a memory 146 local to each retail store 112, monitoring systems 110 store digital images obtained from corresponding camera and recording devices 114 in a central data base, such as database 192 within server 140x of headquarters facility 113 or database 194 coupled to network communications link 180 via a communications link 196.

In one embodiment, the digital images obtained by MSAs 118 are viewable by users via GUIs 120 which access the digital images stored in data bases 146 of servers 140 via a website 190 located on server 140x of headquarters facility 113 and network communications link 180. Although illustrated as being located on server 140x, in other embodiments, website 190 could be located on any server coupled to network communications link 180.

In one embodiment, as described briefly above, intranet communications link 184 comprises a controlled-access communications link between stores 112 and headquarters facility 113. In one embodiment, to access the digital photos stored in memories 146, a user, such as a manager of retail store 112a, enters the URL (Uniform Resource Location), or address, of website 190 into a Web browser located on PC 150a which subsequently locates website 190 via intranet connection 186. To access website 190, the user enters a username and password. Upon entering a valid username and password, the user can access and view selected stored digital images via GUI 120a which is displayed by PC 150a. Although described as being accessed via PC 150, website 190 can be accessed via other types of electronic viewing devices, such as a PDA, for example, and from any location that provides a communication link to intranet 184.

In one embodiment, access to viewing stored images is limited based on a user's logon ID. For instance, in one embodiment, based on the user's unique logon ID, a user associated with a given retail store 112 can access only stored images corresponding to the given retail store 112. For example, a manager of retail store 112a can access only images of locations within retail store 112a which are stored within memory 146a, and cannot access images of other retail stores, such as retail store 112b. In other embodiments, other users, such as certain employees associated with headquarters facility 113, can access images of all retail stores 112a to 112n respectively stored in memories 146a to 146n. In one embodiment, access to viewing stored images is limited based a location from which access is initiated. For example, in one embodiment, each PC, or workstation, 150 has unique hardware identifier which corresponds, at least in part, to the retail store 112 in which PC 150 is located. As such, a user accessing stored images via PC 150a, for example, is limited to viewing only those images stored in memory 146a corresponding to retail store 112a.

Figure 4:
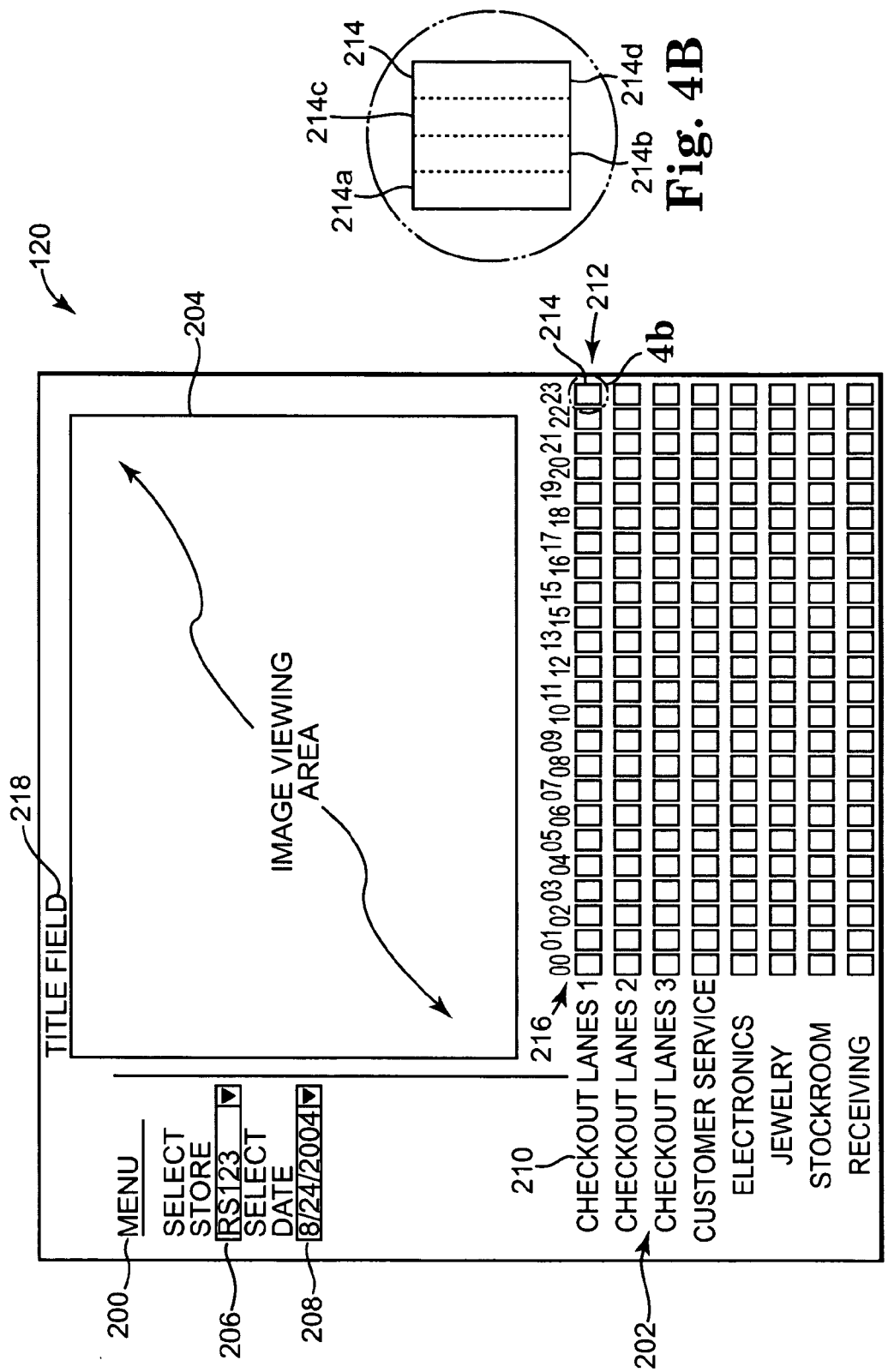
FIG. 4A is an illustration of a graphical user interface for use with one embodiment of a performance monitoring system according to the present invention.
FIG. 4B illustrates in greater detail a portion of the graphical user interface of illustrated in FIG. 4A.

FIG. 4A is an illustrative example of GUI 120 for accessing and viewing digital images provided by performance monitoring systems 110 via website 190 as described above by FIG. 3. GUI 120 includes an options menu 200, an image selection menu 202, and an image display area 204. Options menu 200 includes a pull-down menu 206 that enables a user to select a retail store 112 from which the user would like to view digital images provided by the store's performance monitoring system 110. In one embodiment, pull-down menu 206 comprises a list of unique identification numbers corresponding to each retail store 112 (for example, "RS123" as illustrated in FIG. 4) from which the user can select, such as by selecting the identification number corresponding to the desired retail store with a mouse. Similarly, options menu 200 includes a pull-down menu 208 that enables a user to select a desired date from which the user would like to view images for the desired retail store 112 as selected via pull-down menu 206.

As described above, in one embodiment, access of images is limited based on a user's unique logon ID or location. As such, in one embodiment, pull-down menu 206 comprises the unique identification numbers of only those retail stores 112 to which the user is allowed access as based on the user's password. Thus, for a user having access to only one retail store 112, options menu 200 will include only pull-down menu 208 enabling the user to select a desired date from which to view images of only the retail store 112 with which the user is associated. In lieu of pull-down menu 206, only the unique identification number of the store with which the user is associated will be displayed.

Image selection menu comprises a column 210 of descriptions of monitored locations within the selected retail store (e.g. locations 16 of retail store 12 as illustrated by FIG. 1). Each description of column 210 is followed by a row 212 of icons 214 representative of stored images corresponding to the described location within the selected retail store. In one embodiment, each row comprises 24 icons with each icon representative of images acquired during one hour of the day selected via pull-down menu 208. In one embodiment, as indicated at 216, the columns of icons are labeled as columns "01" through "23" with the icons in the column labeled "00" representative of digital images acquired between 12:00 am and 1:00 am, the icons in the column labeled "01" representative of digital images acquired between 1:00 am and 2:00 am, and so on.

In one embodiment, wherein images of desired locations within a retail store are obtained on 15-minute intervals, each icon 214 is partitioned into four areas 214a through 214d, with each area being representative of one of the four photos acquired during the corresponding hour. For example, as illustrated by the enlarged view of FIG. 4B, icon 214 is representative of images of a first group of check lanes ("check lanes 1") acquired during time period "23", wherein time period "23" corresponds to the time period between 11:00 pm to 12:00 am. As such, areas 214a, 214b, 214c and 214d respectively represent images of the first group of check lanes acquired at 11:00 pm, 11:15 pm, 11:30 pm and 11:45 pm.

After selecting a desired store and a desired date via pull-down menus 206 and 208, a user chooses an image to be viewed by selecting one of the icons 214. In one embodiment, a user selects a desired icon, or desired area of an icon, by mouse-clicking the desired icon 214. Upon selecting a desired image, the image is displayed within image viewing area 204. In one embodiment, image viewing area 204 includes a title field 218 displaying the description of the store location from column 210 corresponding to the selected image (i.e. the camera from which the selected image originated) and an indication of a time frame 220 corresponding to the selected image.

Figure 5:
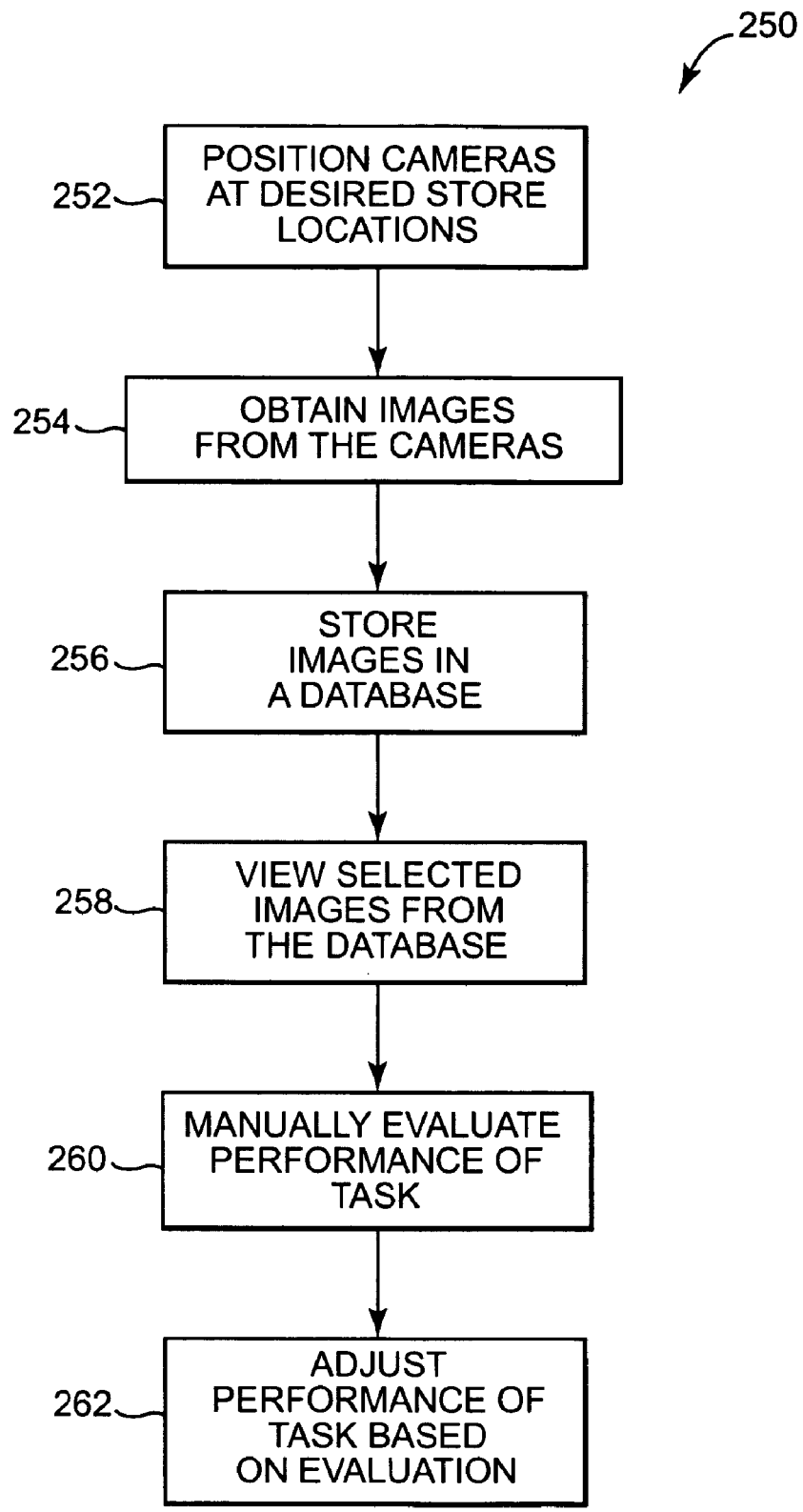
FIG. 5 is a flow diagram illustrating one embodiment of a process for monitoring the performance of a retail store according to the present invention.

FIG. 5 is a flow diagram illustrating one embodiment of a process 250 according to the present invention for monitoring performance of at least one task associated with operation of a retail store. Process 250 begins at step 252 where cameras are provided at desired locations within the retail store where certain tasks which are desired to be monitored are performed, such as positions 16 illustrated by FIG. 1. In one embodiment, as described above, the cameras may be analog video cameras providing analog video signals which are converted into digital video format. In one embodiment, the cameras may be digital video cameras providing a digital video signal. In one embodiment, the cameras may be digital still cameras providing digital still photos. In one embodiment, the cameras may comprise a portion of an existing security surveillance system.

At step 254, images are obtained at selectable intervals from the cameras positioned at step 252. In one embodiment, the images are obtained at regular intervals, such as, for example, 15-minute intervals. In one embodiment, wherein the cameras are analog video cameras, digital still photos are extracted from the digital video signals obtained from the cameras' analog video signals, wherein the extracted images comprise digital still photos of the corresponding areas monitored by the cameras. At step 254, the images obtained at step 254 are stored in a memory. In one embodiment, the obtained images are stored in a database.

At step 258, a user, such as a store manager, views selected images obtained and stored via steps 254 and 256. At step 260, the user manually analyzes at least one factor shown in the viewed images that is related to the performance of a given task in order to evaluate how well the given task was performed. For example, a user may select images of a given location provided by one or more cameras over a certain time period to evaluate the performance of a task that is carried out a that location. For example, a user may select one or more cameras positioned at receiving dock 16f to monitor how long it takes to unload an incoming shipment of products. In this instance, factors related to the unloading of the incoming shipment may include the number of employees engaged in unloading the truck, the size of packages being unloaded, and the time required to unload the truck. From the images, the store manager can evaluate generally the number of employees engaged in unloading the truck and from the time interval of the images selected, estimate how long it took to unload the truck.

At step 262, based on the evaluation of the images at step 260, the user may determine that performance of the task needs to be improved. For example, if the truck took too long to unload, more employees may be assigned to this task for future shipments. Also, if from the images it appeared that there were too many employees assigned to unload the truck, fewer employees may be assigned to unload future shipments.

Figure 6:
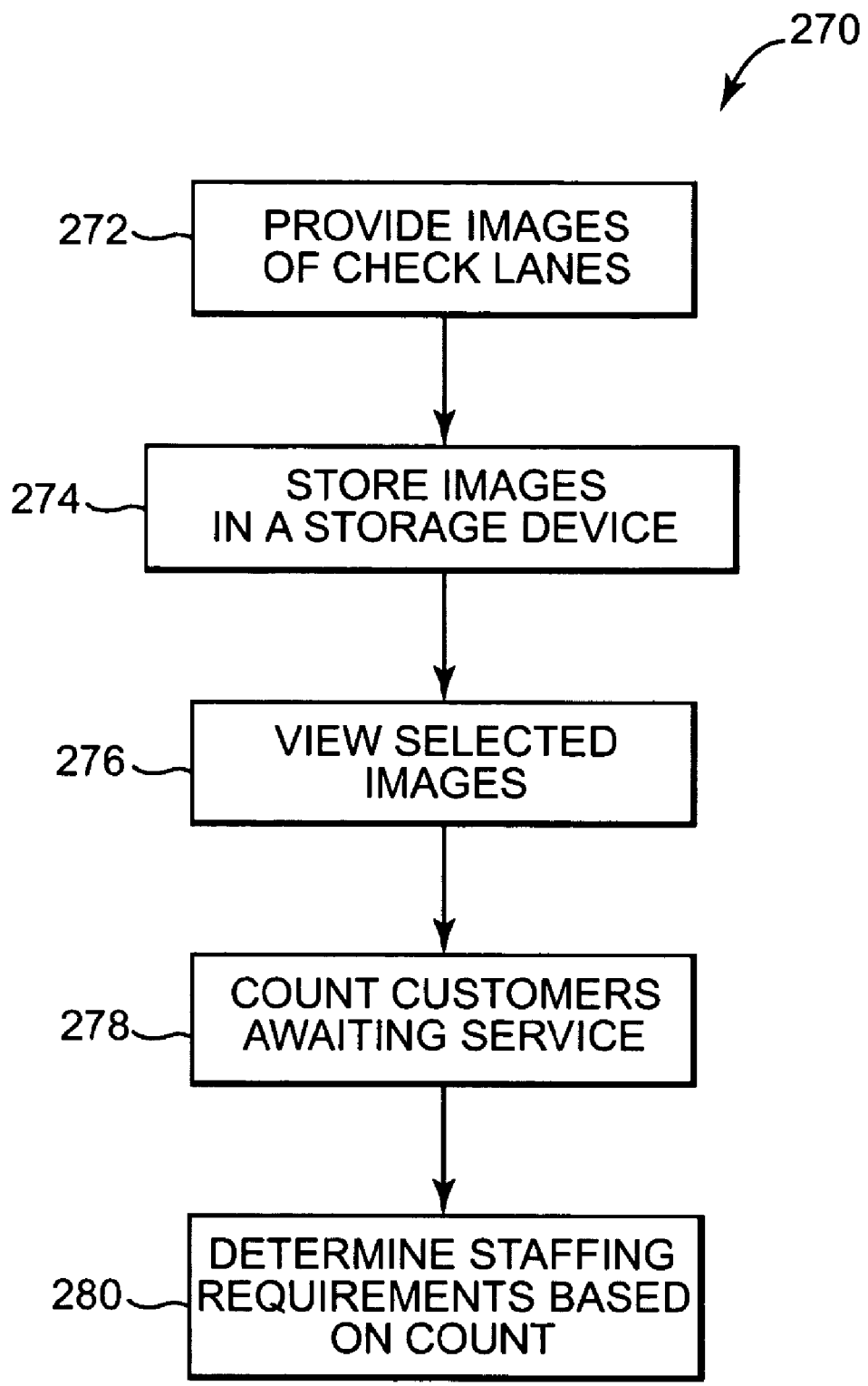
FIG. 6 is a flow diagram illustrating another embodiment of a process for determining staffing requirements of a retail store according to the present invention.

FIG. 6 is a flow diagram illustrating one embodiment of a process 270 according to the present invention for determining staffing requirements at one or more check lanes of a retail store. Process 270 begins at step 272 where still images of the one or more check lanes are provided. In one embodiment, the still images are digital images. At step 274, the still images are stored in a storage device.

At step 276, a user, such as a store manager, selects for viewing one or more images of the one or more check lanes corresponding to a desired time interval. In one embodiment, the digital still images are viewed via an electronic viewing device, such as via the display of a personal computer or a personal digital assistant (PDA). At step 278, the user manually analyzes the one or more selected images to assess generally the customer conditions at the one or more check lanes. If the images permit, a store manager may thoroughly assess customer conditions by manually counting a number of customers awaiting service at the one or more check lanes. The user may also determine a number of cashiers on duty and estimate a length of time customers wait before being served.

At step 278, the store manager may adjust the number of cashiers on duty at that time of the day based on the conditions shown in the images viewed during step 276. For example, with reference to FIG. 1, a store manager may view images obtained from camera 14a during a selected time interval, such as between 4 pm and 5 pm on a given date, to evaluate the performance of check lanes 16a. For instance, if controller 18 obtains images from camera 14a at fifteen minute intervals, the store manager can view the five images (i.e., 4:00, 4:15, 4:30, 4:45 and 5:00) to determine the number of check lanes open (i.e., staffed with a cashier) and the number of customers at each open check lane in order to determine whether more or fewer check lanes should be open during that time of the day. Also, a store manager may view images of a same time period each day over an extended time period (e.g., a week, a month, etc.) to determine trends in customer patterns in order to predict how many cashiers should be available and how many check lanes should be open at a given time.

One aspect of the present invention, as described briefly above with respect to FIG. 2, relates to retrofitting a retail store's existing security system to provide a performance monitoring system according to the present invention, wherein the existing security system includes a plurality of video cameras each providing a video signal of a corresponding location within the retail store. The retrofitting process includes evaluating the positions of the existing video cameras and to select those existing video cameras that provide images of store locations desired to be monitored. If all desired store locations are not adequately monitored, the process includes adding one or more video cameras to the existing security system in order to adequately monitor such store locations.

The process further includes providing a controller adapted to capture digital images from the video signals of selected existing video cameras and newly added video cameras. The process further includes providing a storage device in which to store the captured digital images and providing an interface adapted to enable a user to selectively view the stored digital images in order to evaluate performance of one or more operations taking place at the one or more locations viewed in the digital images.

Although the invention has been described with respect to particular embodiments, such embodiments are for illustrative purposes only and should not be considered to limit the invention. Various alternatives and changes will be apparent to those of ordinary skill in the art.

What is claimed is:

1. A method for actively monitoring activities in a retail store enterprise, the method comprising:
   capturing, with a plurality of image capture devices positioned at a first plurality of positions at a first retail store location, a first plurality of images reflecting activities occurring at the first retail store location, wherein the first plurality of positions include at least customer checkout lanes, a customer service desk and a receiving area of the first retail store location;
   capturing, with a plurality of image capture devices positioned at a second plurality of positions at a second retail store location, a second plurality of images reflecting activities occurring at the second enterprise location, wherein the second plurality of positions include at least customer checkout lanes, a customer service desk and a receiving area of the second retail store location;
   associating each of the images with a unique identifier comprising time, position and location data;
   receiving user access credentials and selectively presenting, at a terminal positioned at a location remote from said first and second retail store locations, a user interface including a first region and a second region based on permissions associated with the credentials, the first region including an array of input areas each associated with at least a time and at least one of the first or second pluralities of positions, the second region including an output area to display an image;
   receiving user input selecting a location and one of the input areas;
   simultaneously displaying i) in the second region, in response to the user input, one or more output images associated with the selected location and the time and the at least one position associated with the selected input area, and ii) in the first region, the array of input areas, the output images showing at least one factor relating to employee performance of at least one task associated with operation of the first or second retail store;
   analyzing the at least one factor and evaluating the employee performance of the at least one task, the at least one factor including one of a number of employees and an amount of unloading time required when unloading an incoming shipment received at the receiving area, a number of customers in the customer checkout lanes, a length of time customers wait before being served, and a number of customers at the customer service desk; and
   adjusting the employee performance of the at least one task based on the step of analyzing the at least one factor, the adjusting being practiced at least by adjusting staffing requirements at a corresponding one of the first or second plurality of positions, the adjusting comprising adjusting a number of cashiers on duty at a specific time of day based on the number of customers in the customer checkout lanes at said specific time of day or based on the length of time customers wait before being served at said specific time of day.

2. The method of claim 1, wherein the location remote from said first and second retail store locations comprises an enterprise headquarters.

3. The method of claim 1, further comprising:
   presenting, at a terminal positioned at the first retail store location, a user interface including said first region and said second region;
   receiving user input selecting one of the input areas; and
   simultaneously displaying in the user interface located at the first retail store location i) in the second region, in response to the user input, one or more output images associated with the time and position associated with the selected input area, and ii) in the first region, the array of input areas.

4. The method of claim 1, wherein the user interface further includes a third region that includes one or more user selection input areas to receive input selecting a date and a retail store location.

5. The method of claim 4, wherein said one or more user selection input areas are displayed simultaneously with the output image and the array of input areas.

6. The method of claim 1, further comprising receiving, at the remote location, user credentials and authenticating said credentials to determine the images to which a user has access.

7. The method of claim 1, further comprising determining permissions to retrieve and view stored images based on the retail store location from which access is initiated.

8. The method of claim 1, wherein the displayed images are frames of video.

9. The method of claim 1, wherein the user interface comprises a secure website.

10. An enterprise monitoring system comprising:
    video monitoring devices located at a plurality of locations within each of a plurality of retail stores in a retail enterprise, at least some of the locations having fields of view covering areas in which retail point of sale activity occurs, the plurality of locations including at least customer checkout lanes, a customer service desk and a receiving area;
    a local video management system at a first retail store operatively coupled to the respective video monitoring devices, wherein the local video management system transmits video for storage at predetermined time intervals;
    a local display device at the first retail store operatively coupled to the local video management system, wherein the local display device selectively displays video based on access credentials for a local user of the local video management system and wherein the display device presents a user interface that simultaneously displays a collection of user selectable input regions associated with a plurality of different times and locations and a video area to display one or more frames of a video associated with a selected input region; and
    an enterprise video management system remote from and communicatively coupled to the local video management system, wherein the enterprise video management system receives users' access credentials and selectively displays the one or more video frames from one or more of the plurality of retail stores based on permissions associated with the credentials, the one or more video frames showing at least one factor relating to employee performance of at least one task associated with operation of the plurality of retail stores, and each of the plurality of retail stores being identified by a unique identification number,
    wherein the enterprise video management system locally presents a user interface that simultaneously includes a collection of user selectable input regions associated with a plurality of different times and locations and a video area to display one or more frames of a video associated with a selected input region, wherein each of the user selectable input regions is associated with one of a plurality of predefined time periods, and wherein each of the predefined time periods is associated with a plurality of video frames over time intervals within the respective time period, the enterprise video management system enabling an analysis of the at least one factor and evaluating the employee performance of the at least one task, the at least one factor including one of a number of employees and an amount of unloading time required when unloading an incoming shipment received at the receiving area, a number of customers in the customer checkout lanes, a length of time customers wait before being served, and a number of customers at the customer service desk, and the enterprise video management system further enabling adjustment of the employee performance of the at least one task based on the analysis, the adjusting comprising adjusting staffing requirements at a corresponding one of the plurality of locations, and the adjusting comprising adjusting a number of cashiers on duty at a specific time of day based on the number of customers in the customer checkout lanes at said specific time of day or based on the length of time customers wait before being served at said specific time of day.

11. The system of claim 10, further comprising a local video management system at a second retail store and a local display device at the second retail store that selectively displays video based on access credentials of a local user, wherein the display device at the second retail store presents a user interface that simultaneously includes a collection of user selectable input regions associated with a plurality of different times and locations and a video area to display one or more frames of a video associated with a selected input region.

12. The system of claim 10, wherein each of the input regions comprises an icon that is uniquely associated with video taken at a predetermined time at a particular location within a given retail store.

13. The system of claim 12, wherein the display presents video in response to a user's selection of an icon.

14. The system of claim 10, wherein the video captured by the video monitoring devices is stored at a central repository communicatively coupled to the enterprise video management system.

15. The system of claim 14, wherein frames of video accessed for display at the user interface at the first retail store are transmitted from the central repository under the control of the enterprise video management system.

16. The system of claim 10, wherein access permissions for a user are determined based on enterprise level credentials.

17. The system of claim 11, wherein access for users at the first and second retail stores is restricted to video taken at the respective stores.

18. The system of claim 10, wherein access for users at the enterprise video management system includes substantially all stores in the retail enterprise.

19. The system of claim 10, wherein the video monitoring devices capture still images at predetermined intervals.

* * * * *